US005096751A

United States Patent [19]

Duchek

[11] Patent Number: 5,096,751

[45] Date of Patent: Mar. 17, 1992

[54] POP-UP ROLLING GREETING CARD

[76] Inventor: Donna J. Duchek, 625 Highway Circle Dr., Manchester, Mo. 63021

[21] Appl. No.: 493,929

[22] Filed: Mar. 15, 1990

[51] Int. Cl.[5] .......... B32B 3/00

[52] U.S. Cl. .......... 428/12; 40/124.1; 40/538; 446/486

[58] Field of Search .......... 40/124.1, 538, 539; 446/486, 488, 431, 487, 147, 148, 478; 428/12

[56] References Cited

U.S. PATENT DOCUMENTS

D. 259,572 6/1981 Renaud .
D. 259,573 6/1981 Renaud .
3,668,796 6/1972 Patterson .
4,319,418 3/1982 Transport .
4,794,024 12/1988 Crowell et al. .

FOREIGN PATENT DOCUMENTS 516460 1/1940 United Kingdom .......... 40/126

*Primary Examiner*—Patrick J. Ryan
*Assistant Examiner*—Cathy Lee
*Attorney, Agent, or Firm*—Rogers, Howell & Haferkamp

[57] ABSTRACT

A pop-up, self-supporting, rolling greeting card includes a pop-up polyhedron with opposing end panels to which are mounted circular panels for supporting the card on its end in a rolling configuration. The polyhedron is collapsible into a generally flattened configuration to facilitate placing the card in an envelope and sending it through the mail or the like.

12 Claims, 1 Drawing Sheet

POP-UP ROLLING GREETING CARD

BACKGROUND AND SUMMARY OF THE INVENTION

Many different styles and designs for greeting cards have been developed over the years and are used for announcing parties, conveying greetings, and for otherwise communicating feelings or emotions. To enhance its utility, designs for greeting cards range from the ordinary to the sublime. Some of these designs seek to heighten the appeal and presentation made by offering some mechanical movement inside the card itself. For example, we are all familiar with greeting cards which, when opened, have a fold-out into a three-dimensional figure. Additionally, cards have been made which can be assembled into various ornamental objects. Still other techniques have been used by card makers in the prior art to add a bit of interest to the card and enhance the card's ability to convey a particular meaning or feeling through a card design which goes beyond the simple flat folded configuration of the majority of cards presently being sold today.

While card designers have made attempts at incorporating paper folding, cut-out, and assembling techniques to improve the versatility of greeting cards, these have all been met with varied response. With a greeting card, expense can be a major factor. This limits the card designer as special, intricate designs require special treatment and, hence, increased costs due to limited production runs. Therefore, cards which have been designed to include mechanical features as described above are limited in their application and their salability.

The inventor herein has succeeded in designing and developing an ornamental greeting card which incorporates an interesting mechanical "pop-up" feature along with a free rolling, self-supporting design, all at reduced cost thereby making the card more desirable as being more salable than other designs in the prior art. In essence, the pop-up, self-supporting, rolling greeting card of the present invention includes a first portion which is comprised of a pop-up polyhedron which is, in and of itself, presently well known in the prior art and which is readily available in large numbers at minimal cost due to its present use in connection with different novelty items. A machine for the commercial manufacture of pop-up polyhedrons is disclosed and described in U.S. Pat. No. 4,613,391. A pop-up polyhedron is characterized by a plurality of side flaps which are folded and which collapse on themselves to permit a configuration of the polyhedron in a flat orientation. One or more rubber bands extend between flaps on opposite sides of the polyhedron and provide the "pop-up" action by pulling the side flaps together to thereby unfold them and move the end panels into a spaced-apart configuration. By fixing a pair of circular panels to each of the pop-up polyhedron's end panels, the pop-up polyhedron will hold these circular panels substantially parallel and fixed in a spaced-apart relationship to provide a self-supporting base for the card. Additionally, as the circular panels have a round periphery, the card is free-rolling.

Although the pop-up polyhedron as described herein as the preferred embodiment is contemplated by the inventor as providing a low-cost card with "action" and which can be rolled after being withdrawn from the envelope, other structures can be interposed between the circular panels forming the wheels. For example, a folded and die cut box may be interposed between the circular panels and folded flat such that when the recipient withdrew the card from its envelope, it could be readily assembled by unfolding the box and inserting flaps into openings as is commonly done with simple cardboard cartons. Still another variation would be to provide two-ply paperboard or the like with one ply being scored or cut and folded such that when the card is removed from the envelope, the remaining ply would have a tendency to separate the circular panels. Other structures could also be used between the two circles in order to achieve the "pop-up" feature desired or which not necessarily "pops up" but instead may be assembled into the functional equivalent of an axle for separating the circular panels such that the circular panels become self-supporting.

In use, ornamentation may be placed on one or both of the circular panels along with an appropriate greeting, invitation, or the like. The circular panels provide a convenient surface to squeeze the polyhedron flat such that the card may be inserted in an envelope for mailing, or the like. As such, the recipient of the card has little advance indication that the envelope contains anything other than a standard greeting card. However, when the card is removed from the envelope, the pop-up polyhedron snaps the circular panels apart to provide impact to the message being conveyed to the recipient. Additionally, the circular panels provide a rolling feature for the card which adds to a recipient's enjoyment thereof such that the card may be kept as a graphic piece of artwork to provide amusement and enjoyment in and of itself. Therefore, the greeting card serves not only to convey an appropriate message, invitation or the like, but also, is a piece of art in and of itself which provides amusement and enjoyment beyond that of a typical greeting card. Additionally, the structural nature of the greeting card provides more opportunity for creativity by the card designer in conveying the desired message. For example, additional surfaces are available for use by the card designer and a rolling motion can be incorporated into a card designer's scheme for conveying the intended message.

While the more important features of the invention have been briefly described above, a fuller understanding of the invention may be attained by referring to the drawings and description of the preferred embodiment which follow.

DETAILED DESCRIPTION OF THE PREFERRED EMBODIMENT

Figure 1:
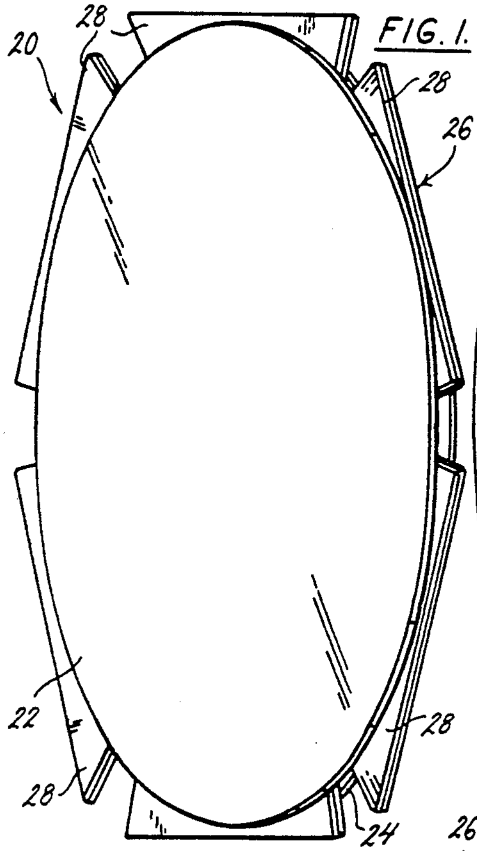
FIG. 1 is a perspective view of the greeting card of the present invention pushed flat into its flattened configuration.
Figure 2:
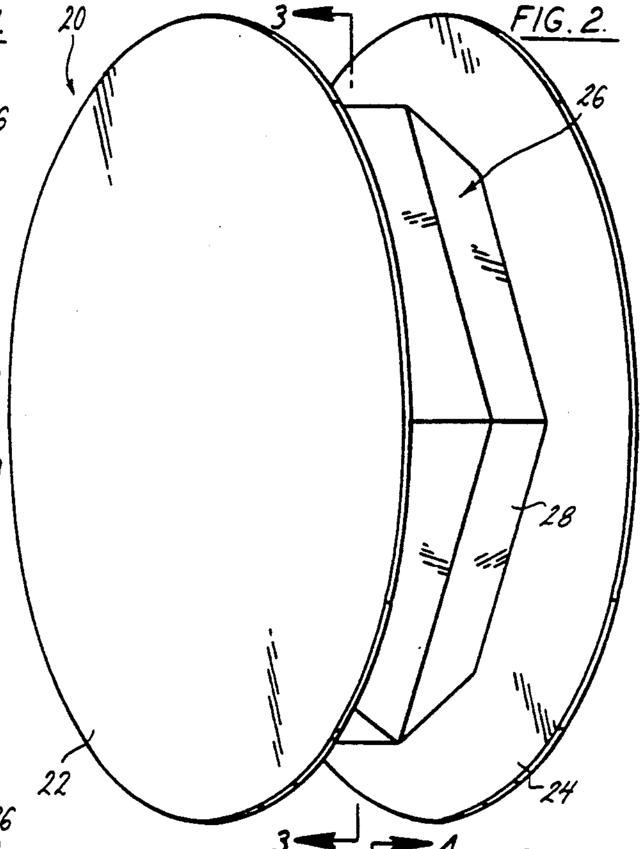
FIG. 2 is a perspective view of the greeting card of the present invention allowed to pop up into its self-supporting, rolling configuration.
Figure 4:
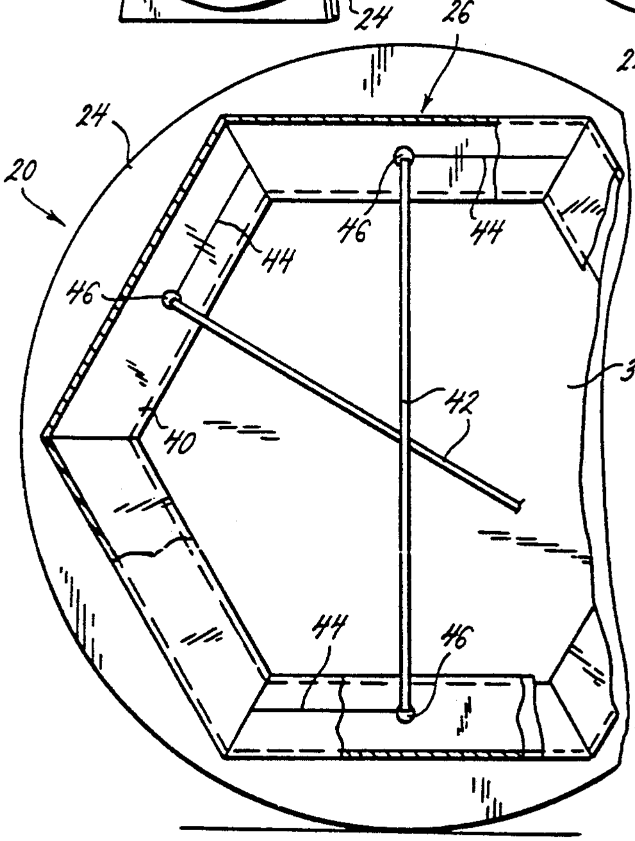
FIG. 4 is a partial cross-sectional view taken along the plane of line 4—4 in FIG. 3 and detailing the elastic bands for forcing the pop-up polyhedron open.
Figure 3:
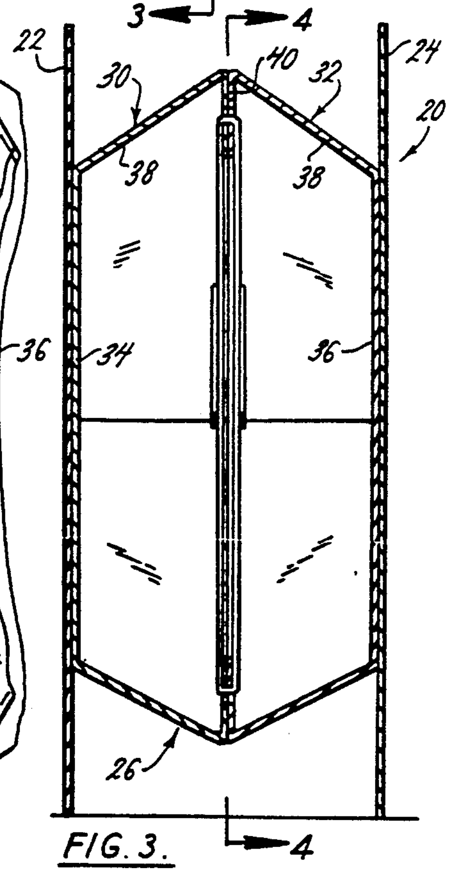
FIG. 3 is a partial cross-sectional view taken along the plane of line 3—3 in FIG. 2 and detailing the pop-up polyhedron and circular panels.

As shown in FIGS. 1 and 2, the self-supporting, free-rolling, pop-up greeting card 20 of the present invention includes a pair of circular panels 22, 24 separated by a pop-up polyhedron 26, polyhedron 26 itself being comprised of a plurality of side flaps 28. The circular panels 22, 24 are held in a spaced apart configuration and are substantially adjacent as shown in FIG. 1, while they are separated as shown in FIG. 2 as the pop-up polyhedron 26 moves from its substantially flattened configuration to its upright configuration. As shown in greater detail in FIG. 3, the polyhedron 26 is made from a pair of cutouts 30, 32 with cutouts 30, 32 being identical in shape. The cutouts 30, 32 each have a flattened end panel 34, 36 which serve as the mounting location for circular panels 22, 24, respectively. The cutouts 30, 32 have a plurality of side flap members 38 which are glued together along an inside flat surface 40 to form each of the side flaps 28. Thus, there is a space formed between side flaps 28 as the polyhedron 26 is moved into its flattened configuration as best shown in FIG. 1. In order to provide a force to "pop-up" the polyhedron 26, one or more elastic bands or rubber bands 42 are threaded through slots 44 and secured in holes 46 formed in inside flaps 40. Thus, rubber bands 42 are completely disposed within the inside of polyhedron 26 such that they are not readily visible and therefore do not detract from the ornamental appearance of the greeting card 20.

In operation, the greeting card 20 as shown in its flattened configuration of FIG. 1 is inserted into an envelope or the like (not shown) and addressed to an intended recipient. Upon its receipt, the recipient opens the envelope and can view the greeting card 20 in its flattened configuration inside the envelope. Thus, upon its receipt and even its initial opening, the recipient does not suspect that the greeting card has any mechanical feature. Thus, it is with an element of pleasant surprise and enjoyment that when the greeting card 20 is removed from its confining envelope, the polyhedron "pops up" to separate the two circular panels in the recipient's hands. This provides an element of surprise and again enhances the recipient's enjoyment in receiving the card. With only the slightest bit of imagination, the recipient will then discover that by placing the card on any generally flat surface, the card becomes a self-supporting, free-wheeling toy which is both functional and yet ornamental. Thus, the self-supporting, pop-up, rolling greeting card of the present invention not only heightens the recipient's interest in the message being conveyed thereby, but is also sufficiently ornamental and unique to serve as a memento of the occasion or event being announced long after it has transpired. All of this leads to the card's ornamental usefulness, its artistic and graphical appearance, and utility both from the sender's and the recipient's viewpoint.

There are various changes and modifications which may be made to the invention as would be apparent to those skilled in the art. As discussed above, the present invention need not necessarily be limited to a pop-up polyhedron for separating the circles which form the wheels of the rolling greeting card of the present invention. Alternately, structure which could be readily assembled by the recipient could be used, as well as various compressed paper structures which would provide a separating force between the circular panels after the card has been removed from an envelope. These changes or modifications are included in the teaching of the disclosure, and it is intended that the invention be limited only by the scope of the claims appended hereto.

What is claimed is:

1. A greeting card having a first portion which pops open from a substantially flat configuration into a polyhedron when removed from an envelope or other restricting enclosure and a second portion for supporting said first portion from at least one substantially curvilinear surface to thereby permit said card to freely move in a rolling motion about said curvilinear surface when placed on a flat supporting surface.

2. The card of claim 1 wherein said second portion further comprises a pair of substantially circular panels, said panels being affixed to opposite sides of said first portion.

3. The card of claim 2 wherein said first portion includes a pair of end panels on opposite sides thereof and which move from a substantially adjacent orientation into a spaced apart orientation as said first portion pops open from said flat configuration to said polyhedron configuration, and said circular panels are affixed to said end panels.

4. The card of claim 3 wherein said circular panels are positioned on said end panels are sufficiently large enough to permit said card to freely roll the full 360° about said circular panels.

5. The card of claim 4 wherein said first portion includes a plurality of side flaps extending between said end panels, said side flaps extending beyond the periphery of the circular panels when the card is in the flat configuration and said side flaps retracting to lie within the periphery of the circular panels as the first portion pops open to its polyhedron configuration.

6. A self-supporting, free-rolling, greeting card having a center section for mounting a pair of circular panels affixed to substantially opposite sides of said center section so that said center section may be used to space said circular panels apart from each other to thereby form a self-supporting, free-rolling structure.

7. The card of claim 6 wherein said center section comprises a pop-up polyhedron.

8. The card of claim 7 wherein the pop-up polyhedron lies within the periphery of said circular panels when it is popped up.

9. The card of claim 8 wherein the pop-up polyhedron collapses into a substantially flat configuration having a pair of substantially adjacent end panels, said circular panels being affixed to said end panels.

10. A self-supporting, pop-up, rolling greeting card comprising a pair of substantially circular panels for forming wheels, said circular panels being separated in a substantially parallel orientation by a pop-up structure so that as said structure pops up it acts as an axle to the circular panels.

11. The card of claim 10 wherein said structure comprises a polyhedron.

12. The card of claim 10 wherein said structure comprises a paper structure with resiliency.

* * * * *